(12) United States Patent
Fall (10) Patent No.: US 9,191,429 B2
(45) Date of Patent: Nov. 17, 2015

(54) DYNAMIC RESOLUTION OF CONTENT REFERENCES FOR STREAMING MEDIA

(71) Applicant: QUALCOMM Incorporated, San Diego, CA (US)

(72) Inventor: Kevin Roland Fall, Berkeley, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 420 days.

(21) Appl. No.: 13/801,720

(22) Filed: Mar. 13, 2013

(65) Prior Publication Data

US 2014/0019632 A1   Jan. 16, 2014

Related U.S. Application Data

(60) Provisional application No. 61/671,627, filed on Jul. 13, 2012.

(51) Int. Cl.
  *G06F 17/30* (2006.01)
  *H04L 29/06* (2006.01)
  *H04N 21/65* (2011.01)
  *H04N 21/845* (2011.01)
  *H04N 21/658* (2011.01)
  *H04N 21/262* (2011.01)

(52) U.S. Cl.
  CPC ........ *H04L 65/608* (2013.01); *G06F 17/30876* (2013.01); *H04L 65/4084* (2013.01); *H04N 21/26258* (2013.01); *H04N 21/6581* (2013.01); *H04N 21/8456* (2013.01)

(58) Field of Classification Search
  None
  See application file for complete search history.

(56) References Cited

U.S. PATENT DOCUMENTS

| 6,807,632 B1 | 10/2004 | Carpentier et al. |
| 6,976,165 B1 | 12/2005 | Carpentier et al. |
| 7,533,141 B2 * | 5/2009 | Nadgir et al. ................. 709/200 |

(Continued)

FOREIGN PATENT DOCUMENTS

| EP | 2613543 A2 | 7/2013 |
| KR | 20120035175 A | 4/2012 |
| WO | 0072574 A2 | 11/2000 |
| WO | 0119079 A1 | 3/2001 |
| WO | WO-2012063094 A1 | 5/2012 |

OTHER PUBLICATIONS

Hakala J., et al., "Persistent identifiers—an overview," The National Library of Finland; Sep. 22, 2010, XP055129070, pp. 1-16.

(Continued)

*Primary Examiner* — Patrice Winder
(74) *Attorney, Agent, or Firm* — Knobbe Martens Olson & Bear LLP (57) ABSTRACT

Systems, methods, and devices for dynamic resolution of content references for streaming media are described. In one innovative aspect, a device for obtaining a media stream is provided. The device includes a receiver configured to receive a location independent persistent identifier for the media stream. The device includes a resolution circuit configured to identify a location of the media stream based at least in part on the location independent persistent identifier. The device includes a media acquisition circuit configured to obtain the media stream based at least in part on the identified location. In some implementations, the resolution circuit is configured to identify a rewrite rule for the media stream and generate a rewritten identifier based on the identified rewrite rule and at least one of the location independent persistent identifier or the identified location.

46 Claims, 5 Drawing Sheets

(56) References Cited

U.S. PATENT DOCUMENTS

| | | | |
|---|---|---|---|
| 7,774,364 B2* | 8/2010 | Anderson et al. | 707/782 |
| 7,873,707 B1 | 1/2011 | Subramanian et al. | |
| 7,904,933 B2* | 3/2011 | Crinon et al. | 725/138 |
| 7,962,580 B2* | 6/2011 | Gagliardi et al. | 709/219 |
| 8,200,810 B2 | 6/2012 | Gagliardi et al. | |
| 2004/0055014 A1* | 3/2004 | Edelson | 725/110 |
| 2009/0092124 A1* | 4/2009 | Singhal et al. | 370/351 |
| 2012/0047542 A1 | 2/2012 | Lewis et al. | |

OTHER PUBLICATIONS

Brandenburg R et al: "Models for adaptive-streaming-aware CDN Interconnection; draft-brandenburg-cdni-has-02.txt", Models for Adaptive-Streaming-Aware CDN Interconnection; Draft-Brandenburg-CDNI-HAS-02.Txt, Internet Engineering Task Force, IETF; Standardworkingdraft, Internet Society (ISOC) 4, Rue Des Falaises CH—1205 Geneva, Switzerland, Jun. 28, 2012, pp. 1-42, XP015083545.

EIDR Entertainment Identifier Registry, "Universal unique identifiers in movie and television supply chain management,"—an Entertainment Identifier Registry (EIDR) whitepaper, Oct. 31, 2010, XP055079652, pp. 1-10.

International Search Report and Written Opinion—PCT/US2013/049949—ISA/EPO—Sep. 30, 2013.

Papish, M., "A method for implementing dynamic, cloud-based metadata services based on a unified content ID space across a fragmented CE ecosystem", Consumer Electronics (ICCE), 2012 IEEE International Conference On, IEEE, Jan. 13, 2012, pp. 57-60, XP032124765, 001: 10.11 09/ICCE.2012.6161736 ISBN: 978-1-4577-0230-3.

* cited by examiner

DYNAMIC RESOLUTION OF CONTENT REFERENCES FOR STREAMING MEDIA

CROSS REFERENCE TO RELATED APPLICATION

This application claims a priority benefit under 35 U.S.C. §119(e) from U.S. Provisional Patent Application No. 61/671,627, entitled "Dynamic Resolution of Content References for Streaming Media," filed Jul. 13, 2012, which is incorporated by reference in its entirety.

BACKGROUND

1. Field

The present invention relates to streaming media, more specifically to dynamic resolution of content references for streaming media.

2. Background

Network access has been increasing in availability. Accompanying the increased availability is an expansion of the number and types of devices capable of communicating on these networks. As more devices, and thus users, gain access to the network, the content available expands as well. One content type that is gaining popularity is multimedia content such as audio and video content.

Media content may be provided as a single file including the images and audio for a media presentation. In some implementations, the media content may be streamed in smaller segments to facilitate efficient transfer of the presentation in an error tolerant, efficient (e.g., bandwidth, power, processing) manner.

An example of a streaming digital media protocol is dynamic adaptive streaming over HTTP (DASH). In some DASH implementations, a media presentation description (MPD) is provided. The MPD may include uniform resource locator (URL) references of only two schemes: HTTP and HTTPS. These references may be used by a client to download the referenced media from an HTTP server.

However, as mentioned above, the types of network and device configurations are constantly changing. Accordingly, there is a need to provide systems and methods for dynamic resolution of content references for streaming media.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include dynamic methods by which chunks of media content (e.g., audio and video segments) may be named and located in the context of a streaming video protocol.

In one innovative aspect, a device for obtaining a media stream is provided. The device includes a receiver configured to receive a location independent persistent identifier for the media stream. The device includes a resolution circuit configured to identify a location of the media stream based at least in part on the location independent persistent identifier. The device includes a media acquisition circuit configured to obtain the media stream based at least in part on the identified location.

In some implementations, the location independent persistent identifier for the media stream is included in a dynamic adaptive streaming over HTTP media presentation description. The identified location may include a location specific identifier for the media stream. The media acquisition circuit, in some implementations, is configured to obtain a portion of the media stream via one or more of HTTP, HTTPS, multimedia broadcast multicast service, and session initiation protocol.

The resolution circuit may be configured to transmit a first message including the received location independent persistent identifier and receive a second message identifying the location of the media stream. In some implementations, the resolution circuit is further configured to identify the location based on information stored in a memory of the device.

The resolution circuit may be further configured to identify the location of the media stream based at least in part on one or more of a characteristic of the device (e.g., a location of the device, a type of the device, and a capability of the device), a time for the identification, and a subscription level associated with the device. The type of the device may include one or more of a mobile device, a desktop device, a tablet device, a set-top device, an appliance, and a machine-to-machine device. The capability of the device comprises one or more of a display capability, an audio capability, a network capability, and a processor capability for the device.

The resolution circuit may be further configured to identify a rewrite rule for the media stream and generate a rewritten identifier based on the identified rewrite rule and at least one of the location independent persistent identifier or the identified location. In some implementations, the location of the media stream is identified based on the rewritten identifier. It may be desirable to identify the rewrite rule based on at least one of an identifier type associated with the location independent persistent identifier and/or the identified location and identification information included within the location independent persistent identifier and/or the identified location. The rewrite rule may also be identified based at least in part on one or more of a characteristic of the device, a time for the determination, and a subscription level associated with the device.

In a further innovative aspect, a method for obtaining a media stream is provided. The method includes receiving a location independent persistent identifier for the media stream. The method includes identifying a location of the media stream based at least in part on the location independent persistent identifier for the media stream. The method also includes obtaining the media stream based at least in part on the identified location.

In some implementations, the location independent persistent identifier for the media stream is included in a dynamic adaptive streaming over HTTP media presentation description. The identified location may include a location specific identifier for the media stream. In some implementation, obtaining the media stream includes obtaining a portion of the media stream via one or more of HTTP, HTTPS, multimedia broadcast multicast service, and session initiation protocol.

Identifying the location may include transmitting a first message including the received location independent persistent identifier and receiving a second message identifying the location of the media stream. Identifying the location may, in some implementations, be based on information stored in a memory of a device receiving the information identifying the media stream.

Identifying the location of the media stream may be based at least in part on one or more of a characteristic of a device requesting the media stream (e.g., a location of the device, a type of the device, and a capability of the device), a time for the identification, and a subscription level associated with the device requesting the media stream. Type of the device may include one or more of a mobile device, a desktop device, a tablet device, a set-top device, an appliance, and a machine-to-machine device. Examples of a capability of the device include one or more of a display capability, an audio capability, a network capability, and a processor capability for the device.

In some implementations, identifying the location for the media stream includes identifying a rewrite rule for the media stream and generating a rewritten identifier based on the identified rewrite rule and at least one of the location independent persistent identifier and/or location identifier. In such implementations, the location of the media stream may be identified based on the rewritten identifier. The rewrite rule may be identified based on at least one of an identifier type associated with the location independent persistent identifier and/or location identifier and identification information included within the location independent persistent identifier and/or location identifier. Alternatively, or in addition, the rewrite rule may be identified based at least in part on one or more of a characteristic of the device, a time for the determination, and a subscription level associated with the device.

In a further innovative aspect, a device for obtaining a media stream is provided. The device includes means for receiving a location independent persistent identifier for the media stream. The device includes means for identifying a location of the media stream based at least in part on the location independent persistent identifier for the media stream. The device includes means for obtaining the media stream based at least in part on the identified location.

In yet another innovative aspect, a computer-readable storage medium comprising instructions executable by a processor of an apparatus is provided. The instructions cause the apparatus to receive a location independent persistent identifier for the media stream. The instructions cause the apparatus to identify a location of the media stream based at least in part on the location independent persistent identifier for the media stream. The instructions cause the apparatus to obtain the media stream based at least in part on the identified location.

In one innovative aspect, a device for providing a location for a media stream is provided. The device includes a receiver configured to receive a location independent persistent identifier for the media stream. The device includes a resolution circuit configured to identify the location of the media stream based at least in part on the location independent persistent identifier. The device also includes a transmitter configured to transmit the identified location.

In some implementations, the location independent persistent identifier for the media stream is included in a dynamic adaptive streaming over HTTP media presentation description. The identified location may include a location specific identifier for the media stream.

The resolution circuit may be configured to transmit a first message including the received location independent persistent identifier and receive a second message identifying the location of the media stream. The resolution circuit may be configured to identify the location based on information stored in a memory of the device.

The receiver, in some implementations, may be configured to receive one or more of a characteristic of another device which transmitted the location independent persistent identifier for the media stream, a time of the reception, and a subscription level associated with the another device. The resolution circuit may be configured to identify the location of the media stream based at least in part on the one or more of a characteristic of another device which transmitted the location independent persistent identifier for the media stream, a time of the reception, and a subscription level associated with the another device.

The characteristic of the another device may include one or more of a location of the another device, a type of the another device, and a capability of the another device. The type of the another device may include one or more of a mobile device, a desktop device, a tablet device, a set-top device, an appliance, and a machine-to-machine device. The capability of the another device may include one or more of a display capability, an audio capability, a network capability, and a processor capability for the another device.

In some implementations, the resolution circuit may be configured to identify a rewrite rule for the media stream and generate a rewritten identifier based on the identified rewrite rule and at least one of the location independent persistent identifier or the identified location. The location of the media stream may be identified based on the rewritten identifier. The rewrite rule may be identified based on at least one of an identifier type associated with the location independent persistent identifier and/or the identified location and identification information included within the location independent persistent identifier and/or the identified location. The rewrite rule may be identified based at least in part on one or more of a characteristic of another device which transmitted the location independent persistent identifier for the media stream, a time of the reception, and a subscription level associated with the another device.

The device may also include a media acquisition circuit configured to obtain the media stream based at least in part on the identified location, wherein the transmitter is further configured to transmit the obtained media stream.

In still another innovative aspect, a method for providing a location for a media stream is provided. The method includes receiving a location independent persistent identifier for the media stream. The method includes identifying the location of the media stream based at least in part on the location independent persistent identifier. The method further includes transmitting the identified location.

In some implementations, the location independent persistent identifier for the media stream is included in a dynamic adaptive streaming over HTTP media presentation description. The identified location may include a location specific identifier for the media stream.

Identifying the location may include transmitting a first message including the received location independent persistent identifier and receiving a second message identifying the location of the media stream. In some implementations, the identification may be based on information stored in a memory of the device.

The method may also include receiving one or more of a characteristic of another device which transmitted the location independent persistent identifier for the media stream, a time of the reception, and a subscription level associated with the another device. In some implementations, identifying the location of the media stream may be based at least in part on the one or more of a characteristic of another device which transmitted the location independent persistent identifier for the media stream, a time of the reception, and a subscription level associated with the another device.

The characteristic of the another device may include one or more of a location of the another device, a type of the another device, and a capability of the another device. The type of the another device may include one or more of a mobile device, a desktop device, a tablet device, a set-top device, an appliance, and a machine-to-machine device. The capability of the another device may include one or more of a display capability, an audio capability, a network capability, and a processor capability for the another device.

In some implementations, the method may include identifying a rewrite rule for the media stream and generating a rewritten identifier based on the identified rewrite rule and at least one of the location independent persistent identifier or the identified location. The location of the media stream may be identified based on the rewritten identifier. The rewrite rule may be selected based on at least one of an identifier type associated with the location independent persistent identifier and/or identified location and identification information included within the location independent persistent identifier and/or identified location. In some implementations, the rewrite rule may be selected based at least in part on one or more of a characteristic of another device which transmitted the location independent persistent identifier for the media stream, a time of the reception, and a subscription level associated with the another device.

The method may also include obtaining the media stream based at least in part on the identified location and transmitting the obtained media stream.

A device for providing a location for a media stream is provided in a further innovative aspect. The device includes means for receiving a location independent persistent identifier for the media stream. The device includes means for identifying the location of the media stream based at least in part on the location independent persistent identifier. The device also includes means for transmitting the identified location.

A computer-readable storage medium comprising instructions executable by a processor of an apparatus is provided in still another innovative aspect. The instructions cause the apparatus to receive a location independent persistent identifier for the media stream. The instructions further cause the apparatus to identify the location of the media stream based at least in part on the location independent persistent identifier. The instructions also cause the apparatus to transmit the identified location.

These and other implementations consistent with the disclosed features are further described below with reference to the following figures.

BRIEF DESCRIPTION OF THE DRAWINGS

In the figures, to the extent possible, elements having the same or similar functions have the same designations.

DETAILED DESCRIPTION

As discussed above, certain streaming media systems include a static declaration of references to the media. This method of declaring segments of a media presentation may be overly restrictive. The static declaration may limit the use of alternative network and/or device deployment scenarios. The static declaration may also be limiting with respect to the spirit of the HTTP URL scheme, which does not require URLs utilizing the HTTP scheme to actually make use of the HTTP protocol. Practically, these methods may limit the fetching of data to a unicast transport model. These methods may not lend themselves to multicast/broadcast distribution, or hybrid combinations of unicast with multicast/broadcast.

What will be described in further detail below is an approach to generalizing the methods by which chunks of media content (e.g., audio and video segments) are named and located in the context of a streaming media protocol. Reference will be made to DASH streaming media protocol. However, one of skill may recognize that one or more aspects of the described aspects may be included in other streaming media protocols.

The segments may be named using a uniform resource indicator (URI) construct. The URI can be processed within the DASH MPD (e.g., a client) such that they may be resolved to a dynamic location. For example, the location may resolve to one or several servers based on the time of access. Furthermore, by modification of a single localized element (e.g., XML element) present in the MPD, all references in the rest of the MPD can be processed in such a way as to refer to alternate locations from their default locations. This may be useful to MPD editors (e.g., persons or applications) that wish to modify the location of content described in a MPD by making small additions to the MPD.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Figure 1:
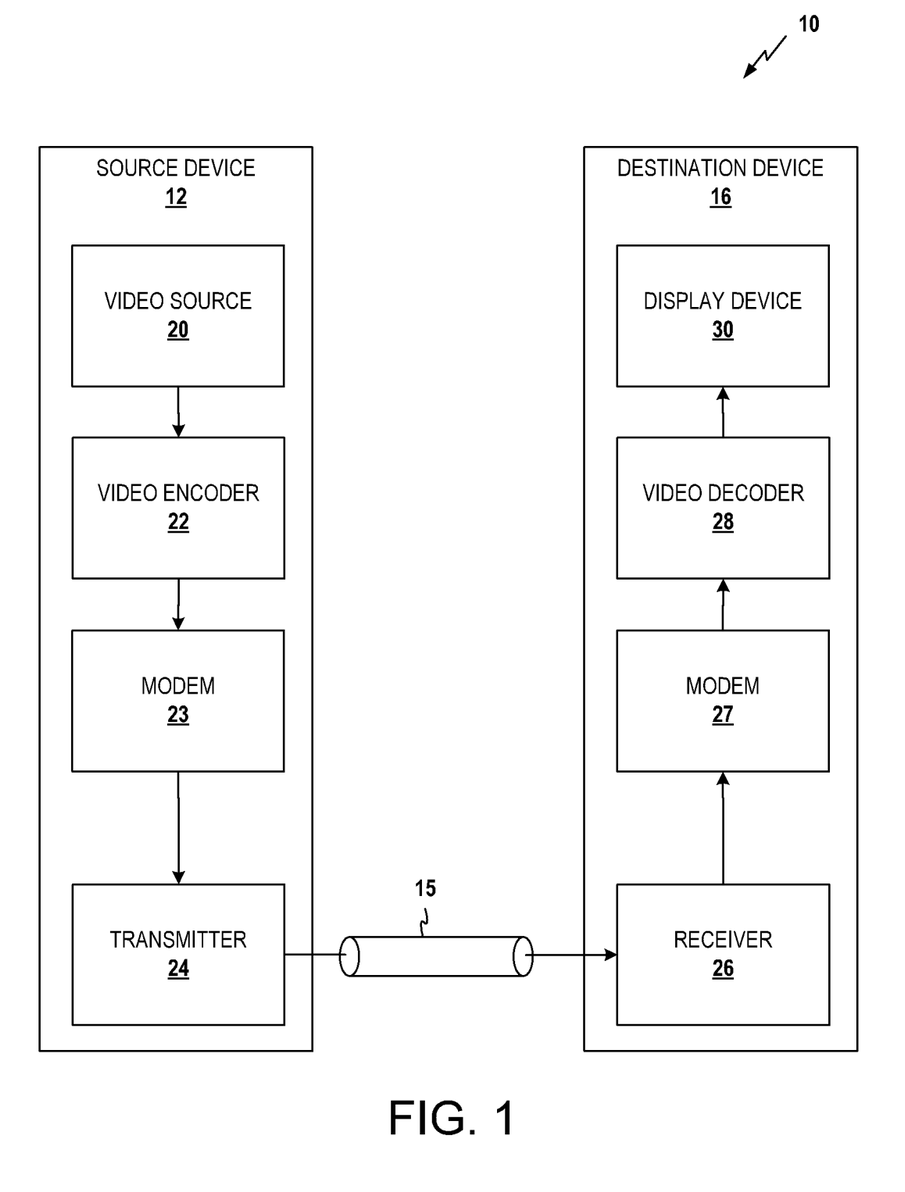
FIG. 1 illustrates a functional block diagram of an exemplary video encoding and decoding system.

FIG. 1 illustrates a functional block diagram of an exemplary video encoding and decoding system. As shown in FIG. 1, system 10 includes a source device 12 that may be configured to transmit encoded video to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the techniques of this disclosure, which concern the dynamic resolution of content references for streaming media, may be used in many different systems and settings. FIG. 1 is merely one example of such a system.

In the example of FIG. 1, source device 12 may include a video source 20, a video encoder 22, a modulator/demodulator (modem) 23, and a transmitter 24. Destination device 16 may include a receiver 26, a modem 27, a video decoder 28, and a display device 30. In accordance with this disclosure, video encoder 22 of source device 12 may be configured to encode a sequence of frames of a reference image. The video encoder 22 may be configured to encode additional information associated with the images such as 3D conversion information including a set of parameters that can be applied to each of the video frames of the reference sequence to generate 3D video data. Modem 23 and transmitter 24 may modulate and transmit wireless signals to destination device 16. In this way, source device 12 communicates the encoded reference sequence along with any additional associated information to destination device 16.

Receiver 26 and modem 27 receive and demodulate wireless signals received from source device 12. Accordingly, video decoder 28 may receive the sequence of frames of the reference image. The video decoder 28 may also receive the additional information which can be used for decoding the reference sequence.

Source device 12 and destination device 16 are merely examples of such coding devices in which source device 12 generates coded video data for transmission to destination device 16. In some cases, device 12 and device 16 may operate in a substantially symmetrical manner such that, each of device 12 and device 16 includes video encoding and decoding components. Hence, system 10 may support one-way or two-way video transmission between video device 12 and device 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. As part of the encoding process, the video encoder 22 may be configured to implement one or more of the methods described herein, such as temporal luminance detection and/or correction for hierarchical frame rate conversion. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 may be configured to receive information over channel 15. Modem 27 may be configured to demodulate the information. Again, the video encoding process may implement one or more of the techniques described herein such as temporal luminance detection and/or correction for hierarchical frame rate conversion. The information communicated over channel 15 may include information defined by video encoder 22, which may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Video encoder 22 and video decoder 28 may operate consistent with a video compression standard, such as the ITU-T H.264 standard, alternatively described as MPEG-4, Part 10, and Advanced Video Coding (AVC). The techniques of this disclosure, however, are not limited to any particular coding standard or extensions thereof. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

While the system shown in FIG. 1 references a video system, it will be appreciated that a similar system may be configured for encoding, transmitting, and decoding other forms of media such as image data and/or audio data.

Figure 2:
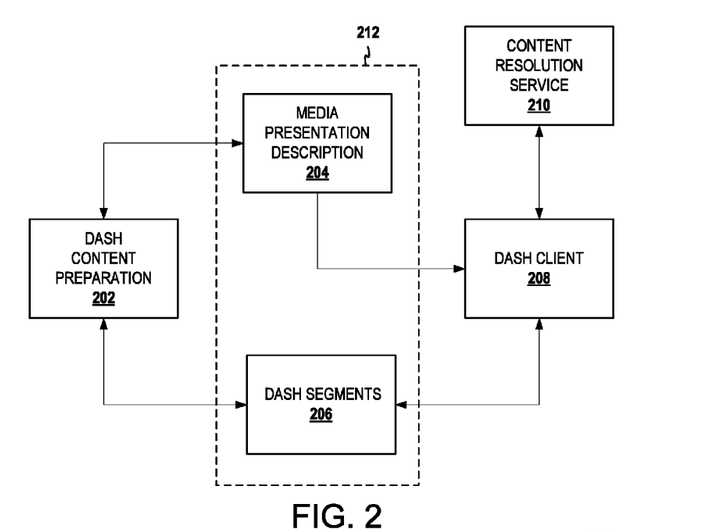
FIG. 2 shows a functional block diagram of an exemplary dynamic adaptive streaming over HTTP system.

FIG. 2 shows a functional block diagram of an exemplary dynamic adaptive streaming over HTTP system. The system may incorporate one or more of the media encoding or decoding aspects described above in reference to FIG. 1. FIG. 2 shows a DASH content preparation server 202. The DASH content preparation server 202 may generate the media content. Generating the media content may include capturing the media content, identifying stored media content, segmenting the media content, or the like. Segmenting the media content may include dividing the media content into a plurality of segments. The segmentation may be based on size of the segments (e.g., memory size), duration of the segments, target client device, transmitting device, or similar factors.

A media presentation description 204 may be generated as part of content preparation. The media presentation description 204 includes information identifying all or a portion of the media content. In some implementations the media presentation description 204 is a file, such as an XML file. This file may be transmitted to a DASH client 208. The DASH client 208 may use the information included in the media presentation description 204 to obtain the media content. As shown in FIG. 2, the DASH client 208 may obtain the DASH segments 206 such as via an HTTP server which includes the DASH segments 206. Other network transport protocols may be used to obtain the DASH segments 206. Examples of other network transport protocols include HTTPS, FTP, SFTP, SIP, RTP, RTSP, and distributed protocols (e.g., torrent). DASH segments are portions of the DASH content prepared by the DASH content preparation server 202.

In some implementations, the media presentation description 204 may include an explicit network address for the DASH segment. However, in some implementations, the media presentation description 204 may include generic information regarding the media stream. In such implementations, the DASH client 204 may need to obtain a network location for the media stream through communication with, for example, a content resolution service 210. The content resolution service 210 may receive a message from the DASH client 208 including media content identifying information included in the media presentation description 204. The content resolution service 210 may be configured to transmit a response including information the DASH client may use to obtain the media content. For example, the response may include a fully qualified URL for the media content. In other implementations, the response may include multimedia broadcast multicast services information which may identify the location of the media content. Other identifiers may include a session initiation protocol identifier.

As shown in FIG. 2, the media presentation description 204 and the DASH segments are provided by a server 212. The server 212 may be an HTTP server and configured for network communication with the DASH client 208 and the DASH content preparation 202. In some implementations, the content resolution service 210 may also be hosted by the server 212.

Figure 3:
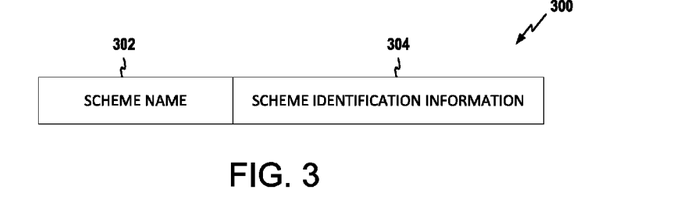
FIG. 3 shows a message diagram of an example identifier including location independent persistent identification information.

FIG. 3 shows a message diagram of an example identifier including location independent persistent identification information. The message 300 includes a scheme name field 302. The scheme name field 302 may include a value indicating an identification scheme that was used to generate the identification information included in the signal 300. For example, the scheme name field 302 may include a unique value identifying a universal resource identifier scheme (e.g., info, isbn). The message 300 also includes a scheme identification information field 304. For example, if the scheme is "info" the scheme identification information field 304 may include "doi: 10.5240/DDA3-C587-D252-DF5F-E8C7-A" as a value in the scheme identification information field 304. In a DASH implementation, this information may be included in a media presentation description. For example if the media presentation description is an XML file, the scheme information may be presented in an element called "BaseURI" included in the file.

For example, consider the following MPD:

```
<?xml version="1.0" encoding="UTF-8"?>
<MPD
       xmlns:xsi="http://www.w3.org/2001/XMLSchema-instance"
       xsi:schemaLocation="urn:mpeg:DASH:schema:MPD:2011
            http://brasspounder.com:8087/pub/MPEG-DASH-2011v34.xsd"
       availabilityStartTime="2012-03-05T18:30:29"
       minBufferTime="PT1S"
       type="static" >
       <BaseURI>info:doi:10.5240/DDA3-C587-D252-DF5F-E8C7-A</BaseURI>
    <Period>
       <AdaptationSet
          mimeType ="video/m4v"
          frameRate = "14.985"
          codecs = "avc1.42401e"
          segmentAlignment = "true"
```

```
        startWithSAP = "1">
        <SegmentTemplate duration="2"
                initialisation="Video/$RepresentationID$/init.m4i"
                media="Video/$RepresentationID$/Segment-$Number$.m4v"
                presentationTimeOff set ="172022"
                startNumber="85986"
            >
            </SegmentTemplate>
        <Representation bandwidth="200000" id="200kbps" width="416"
                height="234"></Representation>
        <Representation bandwidth="2400000" id="2400kbps" width="800"
                height="450"></Representation>
    </AdaptationSet>
</Period>
</MPD>
```

In this example, the reference to the media is via a URI-based EIDR reference, which is itself a DOI reference. The MPD provides no obvious mechanism to determine where to locate these resources, so a separate resolution step (external to DASH in this case) may be included. More precisely, the DASH client processing this MPD (and/or the system upon which it depends) may determine how to find the locations of segments. Consider the following particular segments, which most likely be requested as a result of processing the MPD:

```
info:doi:10.5240/DDA3-C587-D252-DF5F-E8C7-A/Video/200kbps/Segment-85986.m4v
info:doi:10.5240/DDA3-C587-D252-DF5F-E8C7-A/Video/200kbps/Segment-85987.m4v
...
info:doi:10.5240/DDA3-C587-D252-DF5F-E8C7-A/Video/2400kbps/Segment-85986.m4v
info:doi:10.5240/DDA3-C587-D252-DF5F-E8C7-A/Video/2400kbps/Segment-85987.m4v
...
```

These are location-independent references. In this particular example, resolution may be facilitated using the DOI lookup service available at http://ui.eidr.org which is targeted at helping to resolve EIDR IDs. (Note that the use of info: to denote a DOI). A non-standard but syntactically legal construct uses the doi: scheme.

Accordingly the message 300 permits generic URIs, that is, location independent persistent identifier reference values, to be used in place of location specific identifiers such as HTTP or HTTPS URLs. The generic URI syntax which may be included in the fields of the signal 300 may be of the form: {scheme name}: {scheme-specific part} where certain characters (e.g., '/', '?', '#') are used to delimit components. It should be noted, that by using URIs, the specific protocol to retrieve the media content is not limited to HTTP or HTTPS. In some implementations, the DASH client may decode the identification information based on a stored configuration to determine the location of the media content.

In some implementations, the reference to the media content may be via a URI-based Entertainment Industry Identifier Registry (EIDR) reference, which is itself a digital object identifier (DOI) reference. The MPD provides no obvious mechanism to determine where to locate these resources, so a separate resolution step may be provided. For example, the DASH client processing this MPD (and/or the system upon which it depends) must determine how to find the locations of segments such as by consulting a resolution service 210 as described above. For instance, the resolution may be facilitated using a DOI lookup server available at a known address stored in the transmitting or receiving device.

Figure 4:
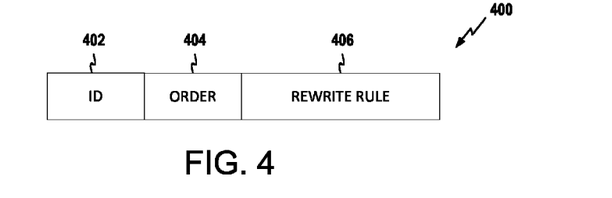
FIG. 4 shows a message diagram of an example message including a rewrite rule.

FIG. 4 shows a message diagram of an example message including a rewrite rule. A rewrite rule may be included in a media presentation description. The message 400 includes an identification field 402. The identification field 402 may include a unique value identifying the rule included in the message. The message 400 includes an order field 404. The order field 404 may be used to identify the sequence for processing the rules. The order field 404 may be an optional field.

The message 400 may also include a rewrite rule field 406. The rewrite rule field 406 may include the instructions identifying how identifiers for media content are altered (e.g., rewritten). For example, the rewrite rule field 406 may include a substitution string (e.g., stream editor, regular expression) identifying the rewrite rule. An example rewrite rule is shown below.

!^doi:10\.5240/(.*)$!http://ui.eidr.org/view/content?uid=10.5240/\1!i

A media presentation description may include more than one rewrite rule. As such, the order may indicate the sequence for processing the multiple rules. In some implementations, more than one rule may have the same order number. In such implementations, the rules having duplicate order numbers may be considered as alternatives. For example, a client may identify two rewrite rules one which rewrites to a DASH server located closer than the DASH server indicated in a second rule. As such, the client may be configured to select the closer server rewrite rule from the multiple rules.

If the media presentation description is an XML file, the rewrite rules may be included XML elements. For example, a resolution element may include one or more method elements. Each method element may include attributes representing the fields shown in FIG. 4. For example, the method element may contain two attributes, an ordering attribute (called order, where a lower attribute value is higher priority) and a substitution expression attribute (called replace).

The resolution element may provide a method by which every URI formed as a result of MPD processing is applied through a string match and replacement capability prior to resolution/access. The method element may be used to indicate one particular re-write matching rule. Multiple matching Method elements may be sorted based on the value of the order attribute. An identifier attribute of the method element may be used to provide a name to the method for reference. The value of this attribute may be ignored when processing a resolution element.

In some implementations, the rewrite rules may use a location specific identifier such as an HTTP or HTTPS URL. However, it should be noted that the rewrite rules may include the generalized identifier described in FIG. 3.

What follows is an example utilizing an MPD including the following resolution element:

```
<Resolution>
<Method id=firstrule order=1
replace="!^doi:10\.5240/(.*)$!http://ui.eidr.org/view/content?uid=10.5240/\1!i" />
<Method id=secondrule order=2 replace="!^info:doi:10(.*)$!http://dx.doi.org/10\1!i" />
<Method id=thirdrule order=3
replace="!^doi:10\.5240(.*)!http://ui.eidr.org/view/content?uid=10.5240/\1!i" />
<Method id=fourthrule order=4 replace="!doi:10\.(.*)!http://dx.doi.org/10.\1!i" />
</Resolution>
```

This example means that any URI to be resolved is first processed through the list of Methods which may or may not contain a replace attribute that matches. Matching Method elements are sorted in order based on their order attribute values, and the one with the lowest value is executed as a string replacement.

So, the resolutions for:

```
info:doi:10.5240/DDA3-C587-D252-DF5F-E8C7-A/Video/200kbps/Segment-85986.m4v
info:doi:10.5240/DDA3-C587-D252-DF5F-E8C7-A/Video/200kbps/Segment-85987.m4v
...
``` mentioned above would result in accesses for the following URIs:

```
http://dx.doi.org/10.5240/DDA3-C587-D252-DF5F-E8C7-A/Video/200kbps/Segment-85986.m4v
http://dx.doi.org/10.5240/DDA3-C587-D252-DF5F-E8C7-A/Video/200kbps/Segment-85987.m4v
...
```

Note that for this example to fully function, the resolver service at http://dx.doi.org would need to understand the complete syntax. Practical deployments would likely prefer to use a provider-specified resolution service (e.g., ProviderX might wish to use http://doi-resolve.providerx.net in place of http://dx.doi.org if they were to provide such mappings).

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

Figure 5:
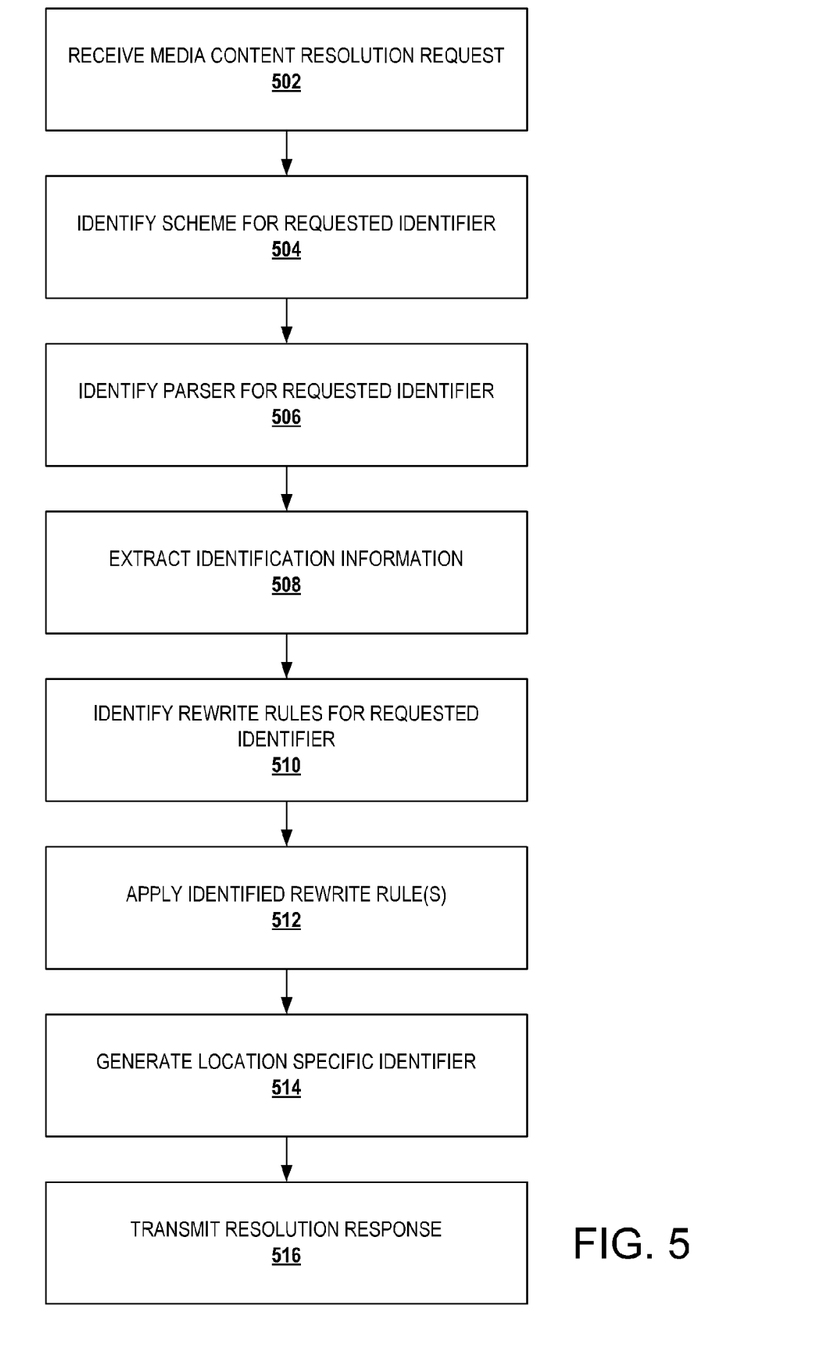
FIG. 5 shows a process flow diagram illustrating the resolution of a media identifier.

FIG. 5 shows a process flow diagram illustrating the resolution of a media identifier. At node 502, a media content resolution request is received. The media content resolution request may include a message such as that shown in FIG. 3. The media content resolution request may also include information about the device submitting the request. For example, the information may include a device type (e.g., A mobile device, a desktop device, a tablet device, a set-top device, an appliance, a machine to machine device), a location for the device (e.g., a spatial coordinate, a network location, a network address, a cell address), and/or a capability of the device (e.g., a display capability such as display size, resolution, color depth, pixels; an audio capability such as rate, filter, types of output, number of outputs; a network capability such as antenna capabilities, frequencies, bandwidth, etc.; and a processor capability such as processor type, processor speed, etc.). The information may include a time the request is submitted, a network via which the request is submitted, an operator associated with the request, a publisher/owner of the requested media content, or other such information.

At node 504, a scheme for the requested identifier is identified. The scheme may be identified by extracting the location independent specific identifier from the media content resolution request. As discussed above, the scheme may be included as part of the message such as that shown in FIG. 3. The scheme may be located in a preconfigured location within the message such that it may be parsed from the message.

At node 506, a parser for the requested identifier may be identified. As each scheme may represent the identification information included in the message in accordance with the scheme, a parser may be identified to process the media content identifier to be resolved.

At node 508, identification information is extracted from the media content resolution request based at least in part on the identified parser and/or the identified scheme.

At node 510, one or more rewrite rules for the requested identifier for resolution may be identified. The rewrite rules may be identified based on the scheme, the scheme specific identification information, or other information from the media content resolution request. The identification may include consulting a stored collection of rewrite rules for the system and identifying one or more rewrite rules which are associated with, for example, the scheme, scheme specific identification information, or other information from the media content resolution request.

At node 512, any identified rewrite rules are applied. A rewrite rule, as discussed above such as in reference to FIG. 4, may be a regular expression string or a stream editor. As also discussed, multiple rewrite rules may be identified. In such circumstances, the application at node 512 may also include a determination of an order in which to apply the rewrite rules. For example each rule may be provided a numerical rank (e.g., order 404). The rules are then applied based on the provided numerical rank. In such implementations, a network operator may control which rewrite rules are applied and how the rules are applied.

At node 514, a location specific identifier is generated. The generation of the location specific identifier may be based on the rewritten identification information from node 512, the scheme, or other information included in the media content resolution request. For example, if a media content resolution request is submitted by a device that is a mobile device, it may be desirable in some implementations to provide a lower bandwidth media stream then for a request submitted by a set-top box. In some implementations, it may be desirable to provide subscribers at a premium level a premium experience such as access to media hosted on faster servers, media which is of a higher quality, and the like.

In some implementations, the generation of the location specific identifier may be based on stored location information. For example, a cache of resolved identifiers may be maintained. In such implementations, the cache may be consulted prior to or as part of the generation process. If a valid (e.g., non-expired) corresponding entry is found in the cache, the cached version may be used rather than generating a new location identifier for this resolution request.

In some implementations, the generation of the location specific identifier may include messaging with another server. For example, where generating the location specific identifier is based on subscription level, the generating may include messaging to determine the subscription level for the resolution request. In some implementations, messaging may be included to resolve the location with the publisher of the media content. For example, the publisher of the media content may host the media on a variety of servers and, based on certain factors such as load, content type, duration of content, etc., select an appropriate server at the time the resolution request is being processed. This allows more flexibility for the publishers in terms of how the media content is hosted and ultimately provided.

At node 516, the resolution response is transmitted. The resolution response may include the location specific identifier for the requested media content. In some implementations, the resolution response may include the media content. In such implementations, the generated location specific identifier may be used to obtain the media stream. The obtained stream may then be transmitted to the device requesting the resolution.

These examples illustrate how a location specific identifier can be generated from a single generic location independent persistent identifier included in an MPD. Numerous factors have been described as the basis for resolving the location specific identifier. Various advantages are provided through the flexible dynamic resolution process described herein. For example, the media content may be hosted via different transport protocols, at different network locations, at different times, for different devices. Providing MPDs for each permutation may be prohibitively expensive. As the system may be dynamically configured to define new parsers and or rewrite rules, the resolution process facilitates expanded possibilities for dynamic content provision.

Figure 6:
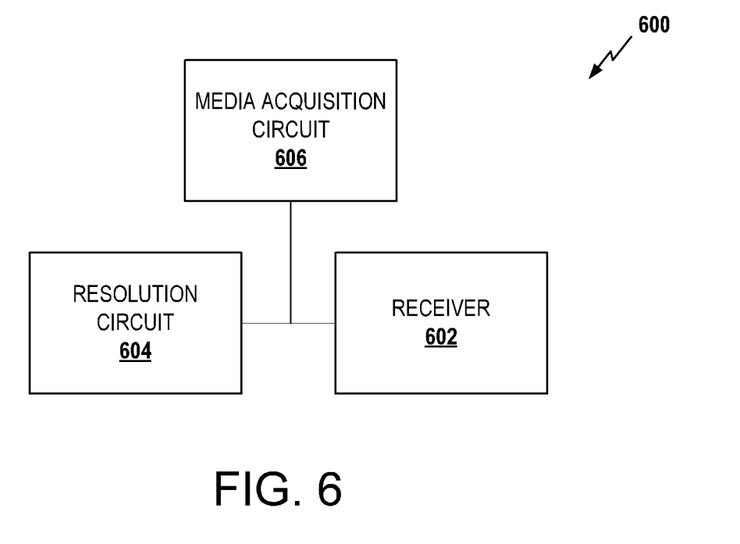
FIG. 6 shows a functional block diagram of a device for obtaining a media stream.

FIG. 6 shows a functional block diagram of a device for obtaining a media stream. The device 600 shows only some of the features that may be included in a device for obtaining media streams. In some implementations, the device 600 may be implemented as the DASH client 208 shown in FIG. 2.

The device 600 includes a receiver 602. The receiver may be configured to receive a location independent persistent identifier for the media stream. In some implementations means for receiving may include the receiver 602.

The device 600 also includes a resolution circuit 604. The resolution circuit 604 is configured to identify a location of the media stream based at least in part on a location independent persistent identifier for the media stream. In some implementations, means for identifying the location of the media stream may include the resolution circuit 604.

The device 600 also includes a media acquisition circuit 606 configured to obtain the media stream based at least in part on the identified location. In some implementations means for obtaining the media stream may include the media acquisition circuit 606.

Figure 7:
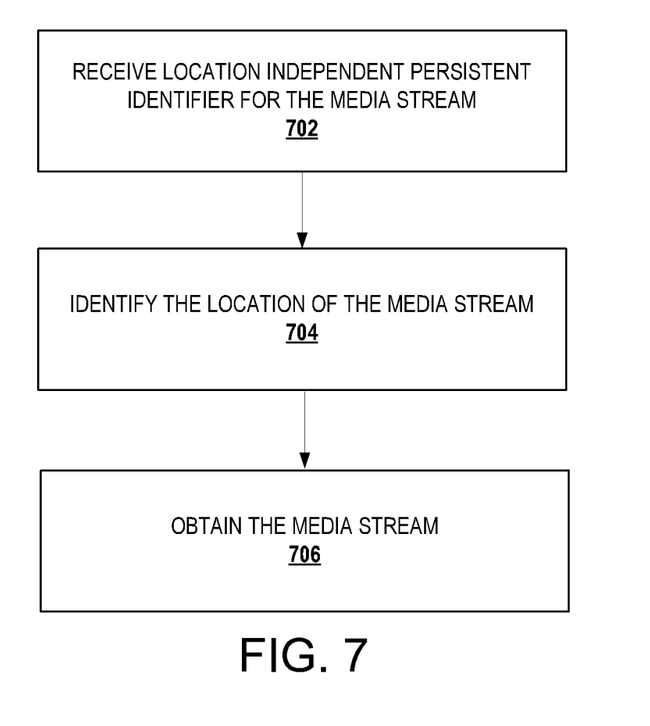
FIG. 7 shows a process flow diagram of a method for obtaining a media stream.

FIG. 7 shows a process flow diagram of a method for obtaining a media stream. The method may be implemented in one more of the devices described above such as that shown in FIG. 6. At node 702, a location independent persistent identifier for the media stream is received. At node 704, the location of the media stream is determined based at least in part on the location independent persistent identifier for the media stream. At node 706, the media stream is acquired based at least in part on the identified location. For example, the location may be identified as an HTTP location for the media content.

Figure 8:
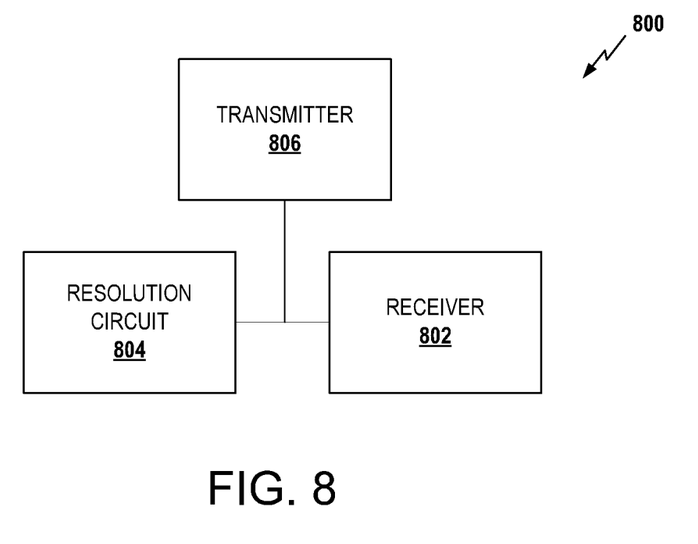
FIG. 8 shows a functional block diagram of a device for providing a location for a media stream.

FIG. 8 shows a functional block diagram of a device for providing a location for a media stream. The device 800 shows only some of the features that may be included in a device for providing a location for media streams. In some implementations, the device 800 may be implemented as the content resolution service 210 shown in FIG. 2.

The device 800 includes a receiver 802. The receiver may be configured to receive a location independent persistent identifier for the media stream. In some implementations means for receiving may include the receiver 802.

The device 800 also includes a resolution circuit 804. The resolution circuit 804 is configured to identify the location of the media stream based at least in part on the location independent persistent identifier. For example, the received information may include rewrite rules which may be selectively executed by the device. In some implementations, means for identifying the location of the media stream may include the resolution circuit 804.

The device 800 also includes a transmitter 806 configured to transmit the identified location. In some implementations means for transmitting may include the transmitter 806.

Figure 9:
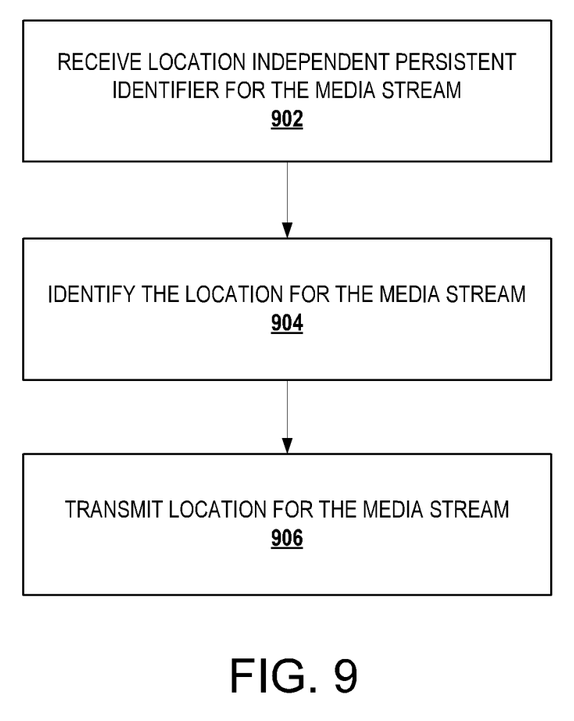
FIG. 9 shows a process flow diagram of a method for obtaining a media stream.

FIG. 9 shows a process flow diagram of a method for obtaining a media stream. The method may be implemented in one more of the devices described above such as that shown in FIG. 8. At node 902, a location independent persistent identifier for the media stream is received. At node 904, the location of the media stream is identified based at least in part on the location independent persistent identifier for the media stream. At node 906, the identified location is transmitted. For example, the location may be identified as an HTTP location for the media content.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A device for obtaining a media stream, the device comprising:
   a memory storing a rewrite rule identifying device specific adjustments to a base location for the media stream;
   a receiver, at least partially implemented in hardware, and configured to receive a location independent persistent identifier for the media stream;
   a resolution circuit, at least partially implemented in hardware, and configured to:

identify the base location of the media stream using the location independent persistent identifier, and generate a location specific identifier for the media stream using the base location and the rewrite rule to add or modify a value included in the base location; and a media acquisition circuit, at least partially implemented in hardware, and configured to obtain the media stream using the location specific identifier.

2. The device of claim 1, wherein the location independent persistent identifier for the media stream is included in a dynamic adaptive streaming over HTTP media presentation description.

3. The device of claim 1, wherein the resolution circuit is further configured to:

transmit a first message including the received location independent persistent identifier; and receive a second message identifying the base location of the media stream.

4. The device of claim 1, wherein the media acquisition circuit is configured to obtain a portion of the media stream via one or more of HTTP, HTTPS, multimedia broadcast multicast service, and session initiation protocol.

5. The device of claim 1, wherein the device specific adjustments are based at least in part on one or more of a characteristic of the device, a time for the identification, and a subscription level associated with the device.

6. The device of claim 5, wherein the characteristic of the device includes one or more of a location of the device, a type of the device, and a capability of the device.

7. The device of claim 6, wherein the type of the device comprises one or more of a mobile device, a desktop device, a tablet device, a set-top device, an appliance, and a machine-to-machine device.

8. The device of claim 6, wherein the capability of the device comprises one or more of a display capability, an audio capability, a network capability, and a processor capability for the device.

9. The device of claim 1, wherein the receiver is further configured to receive the rewrite rule in a message, the message including the location independent persistent identifier for the media stream.

10. The device of claim 9, wherein the resolution circuit is configured to identify the rewrite rule from a plurality of rewrite rules stored in the memory, wherein the resolution circuit is configured identify the rewrite rule using at least one of an identifier type associated with the at least one of the location independent persistent identifier or the location specific identifier, and wherein the resolution circuit is further configured identify the rewrite rule using identification information included within the at least one of the location independent persistent identifier or the location specific identifier.

11. The device of claim 10, wherein the resolution circuit is configured to identify the rewrite rule using at least in part one or more of a characteristic of the device, a time for the determination, and a subscription level associated with the device.

12. A method for obtaining a media stream, the method comprising:

storing a rewrite rule in a memory device, the rewrite rule identifying device specific adjustments to a base location for the media stream;

receiving a location independent persistent identifier for the media stream;

identifying the base location of the media stream using the location independent persistent identifier for the media stream;

generating a location specific identifier for the media stream using the base location and the rewrite rule to add or modify a value included in the base location; and obtaining the media stream using the location specific identifier.

13. The method of claim 12, wherein the location independent persistent identifier for the media stream includes a dynamic adaptive streaming over HTTP media presentation description.

14. The method of claim 12, wherein identifying the location comprises:

transmitting a first message including the received location independent persistent identifier; and receiving a second message identifying the base location of the media stream.

15. The method of claim 12, wherein obtaining the media stream comprises obtaining a portion of the media stream via one or more of HTTP, HTTPS, multimedia broadcast multicast service, and session initiation protocol.

16. The method of claim 12, wherein the device specific adjustments are based at least in part on one or more of a characteristic of a device requesting the media stream, a time for the identification, and a subscription level associated with the device requesting the media stream.

17. The method of claim 16, wherein the characteristic of the device includes one or more of a location of the device, a type of the device, and a capability of the device.

18. The method of claim 17, wherein the type of the device comprises one or more of a mobile device, a desktop device, a tablet device, a set-top device, an appliance, and a machine-to-machine device.

19. The method of claim 17, wherein the capability of the device comprises one or more of a display capability, an audio capability, a network capability, and a processor capability for the device.

20. The method of claim 12, further comprising:

receiving the rewrite rule in a message, the message including the location independent persistent identifier for the media stream.

21. The method of claim 20, wherein the rewrite rule is identified from a plurality of rewrite rules stored in the memory device, the rewrite rule identified using at least one of an identifier type associated with the at least one of the location independent persistent identifier or the location specific identifier, and wherein the rewrite rule is further identified using identification information included within the at least one of the location independent persistent identifier or the location specific identifier.

22. The method of claim 21, wherein the rewrite rule is identified using at least in part one or more of a characteristic of the device, a time for the determination, and a subscription level associated with the device.

23. A device for obtaining a media stream, the device comprising:

means for storing a rewrite rule identifying device specific adjustments to a base location for the media stream;

means for receiving a location independent persistent identifier for the media stream;

means for identifying the base location of the media stream using the location independent persistent identifier for the media stream and for generating a location specific identifier for the media stream using the base location and the rewrite rule to add or modify a value included in the base location; and means for obtaining the media stream using the location specific identifier.

24. A non-transitory computer-readable storage medium comprising instructions executable by a processor of an apparatus, the instructions causing the apparatus to:
- store a rewrite rule in a memory device, the rewrite rule identifying device specific adjustments to a base location for the media stream;
- receive a location independent persistent identifier for the media stream;
- identify the base location of the media stream using the location independent persistent identifier for the media stream;
- generate a location specific identifier for the media stream using the base location and the rewrite rule to add or modify a value included in the base location; and
- obtain the media stream using the location specific identifier.

25. A device for providing a location for a media stream, the device comprising:
- a memory storing a rewrite rule identifying device specific adjustments to a base location for the media stream;
- a receiver, at least partially implemented in hardware, and configured to receive a location independent persistent identifier for the media stream;
- a resolution circuit, at least partially implemented in hardware, and configured to:
  - identify the base location of the media stream using the location independent persistent identifier, and
  - generate a location specific identifier for the media stream using the base location and the rewrite rule to add or modify a value included in the base location; and
- a transmitter, at least partially implemented in hardware, and configured to transmit the location specific identifier.

26. The device of claim 25, wherein the location independent persistent identifier for the media stream is included in a dynamic adaptive streaming over HTTP media presentation description.

27. The device of claim 25, wherein the resolution circuit is configured to:
- transmit a first message including the received location independent persistent identifier; and
- receive a second message identifying the base location of the media stream.

28. The device of claim 25, wherein the receiver is configured to receive one or more of a characteristic of another device which transmitted the location independent persistent identifier for the media stream, a time of the reception, and a subscription level associated with the another device; and
- wherein the device specific adjustments are based at least in part on the one or more of a characteristic of another device which transmitted the location independent persistent identifier for the media stream, a time of the reception, and a subscription level associated with the another device.

29. The device of claim 28, wherein the characteristic of the another device includes one or more of a location of the another device, a type of the another device, and a capability of the another device.

30. The device of claim 28, wherein the type of the another device comprises one or more of a mobile device, a desktop device, a tablet device, a set-top device, an appliance, and a machine-to-machine device.

31. The device of claim 28, wherein the capability of the another device comprises one or more of a display capability, an audio capability, a network capability, and a processor capability for the another device.

32. The device of claim 25, wherein the resolution circuit is configured to identify the rewrite rule from a plurality of rewrite rules stored in the memory, wherein the resolution circuit is configured to identify the rewrite rule identified using at least one of an identifier type associated with the at least one of the location independent persistent identifier or the location specific identifier, and wherein the resolution circuit is further configured identify the rewrite rule using identification information included within the at least one of the location independent persistent identifier or the location specific identifier.

33. The device of claim 32, wherein the resolution circuit is configured to identify the rewrite rule using at least in part one or more of a characteristic of another device which transmitted the location independent persistent identifier for the media stream, a time of the reception, and a subscription level associated with the another device.

34. The device of claim 25, further comprising a media acquisition circuit configured to obtain the media stream using the location specific identifier, wherein the transmitter is further configured to transmit the obtained media stream.

35. A method for providing a location for a media stream, the method comprising:
- storing a rewrite rule in a memory device, the rewrite rule identifying device specific adjustments to a base location for the media stream;
- receiving a location independent persistent identifier for the media stream;
- identifying the base location of the media stream using the location independent persistent identifier for the media stream;
- generating a location specific identifier for the media stream using the base location and the rewrite rule to add or modify a value included in the base location; and
- transmitting the location specific identifier.

36. The method of claim 35, wherein the location independent persistent identifier for the media stream is included in a dynamic adaptive streaming over HTTP media presentation description.

37. The method of claim 35, wherein identifying the location of the media stream comprises:
- transmit a first message including the received location independent persistent identifier; and
- receive a second message identifying the base location of the media stream.

38. The method of claim 35, further comprising receiving one or more of a characteristic of another device which transmitted the location independent persistent identifier for the media stream, a time of the reception, and a subscription level associated with the another device,
- wherein the device specific adjustments are based at least in part on the one or more of a characteristic of another device which transmitted the location independent persistent identifier for the media stream, a time of the reception, and a subscription level associated with the another device.

39. The method of claim 38, wherein the characteristic of the another device includes one or more of a location of the another device, a type of the another device, and a capability of the another device.

40. The method of claim 38, wherein the type of the another device comprises one or more of a mobile device, a desktop device, a tablet device, a set-top device, an appliance, and a machine-to-machine device.

41. The method of claim 38, wherein the capability of the another device comprises one or more of a display capability, an audio capability, a network capability, and a processor capability for the another device.

42. The method of claim 35, wherein the rewrite rule is identified from a plurality of rewrite rules stored in the memory device, the rewrite rule identified using at least one of an identifier type associated with the at least one of the location independent persistent identifier or the location specific identifier, and wherein the rewrite rule is further identified using identification information included within the at least one of the location independent persistent identifier or the location specific identifier.

43. The method of claim 42, wherein the rewrite rule is identified using at least in part one or more of a characteristic of another device which transmitted the location independent persistent identifier for the media stream, a time of the reception, and a subscription level associated with the another device.

44. The method of claim 35, further comprising:
obtaining the media stream using the location specific identifier; and
transmitting the obtained media stream.

45. A device for providing a location for a media stream, the device comprising:
means for storing a rewrite rule identifying device specific adjustments to a base location for the media stream;
means for receiving a location independent persistent identifier for the media stream;
means for identifying the base location of the media using the location independent persistent identifier for the media stream and for generating a location specific identifier for the media stream using the base location and the rewrite rule to add or modify a value included in the base location; and
means for transmitting the location specific identifier.

46. A non-transitory computer-readable storage medium comprising instructions executable by a processor of an apparatus, the instructions causing the apparatus to:
store a rewrite rule identifying device specific adjustments to a base location for the media stream;
receive a location independent persistent identifier for the media stream;
identify the base location of the media stream using the location independent persistent identifier for the media stream;
generate a location specific identifier for the media stream using the base location and the rewrite rule to add or modify a value included in the base location; and
transmit the location specific identifier.

* * * * *